United States Patent [19]
Asai

[11] Patent Number: 5,708,483
[45] Date of Patent: Jan. 13, 1998

[54] ACTIVE MATRIX TYPE DISPLAY DEVICE

[75] Inventor: Yoshihiro Asai, Himeji, Japan

[73] Assignee: Kabushiki Kaisha Toshiba, Kawasaki, Japan

[21] Appl. No.: 397,150

[22] PCT Filed: Jul. 13, 1994

[86] PCT No.: PCT/JP94/01143

§ 371 Date: Mar. 13, 1995

§ 102(e) Date: Mar. 13, 1995

[87] PCT Pub. No.: WO95/02847

PCT Pub. Date: Jan. 26, 1995

[30] Foreign Application Priority Data

Jul. 13, 1993 [JP] Japan .................. 5-172763
Jul. 13, 1993 [JP] Japan .................. 5-172764

[51] Int. Cl.$^6$ .................. G02F 1/1343; G02F 1/1333
[52] U.S. Cl. .................. 349/38; 349/110
[58] Field of Search .................. 359/59, 54, 87; 349/38, 39, 110, 111

[56] References Cited

U.S. PATENT DOCUMENTS

| 4,753,518 | 6/1988 | Clerc | 359/59 |
|---|---|---|---|
| 5,159,476 | 10/1992 | Hayashi | 359/59 |
| 5,339,181 | 8/1994 | Kim et al. | 359/54 |
| 5,402,254 | 3/1995 | Sasano et al. | 359/59 |
| 5,459,596 | 10/1995 | Ueda et al. | 359/59 |
| 5,508,765 | 4/1996 | Nakagawa et al. | 359/87 |
| 5,528,395 | 6/1996 | So | 359/59 |

FOREIGN PATENT DOCUMENTS

| 271313 | 6/1988 | European Pat. Off. | 359/59 |
|---|---|---|---|
| 60-207116 | 10/1985 | Japan . | |
| 1123217 | 5/1989 | Japan . | |
| 1291219 | 11/1989 | Japan . | |
| 356939 | 3/1991 | Japan . | |
| 3-100626 | 4/1991 | Japan | 359/59 |
| 3196020 | 8/1991 | Japan . | |
| 4104227 | 4/1992 | Japan . | |
| 4-307520 | 10/1992 | Japan . | |
| 566420 | 3/1993 | Japan . | |
| 5127195 | 5/1993 | Japan . | |

OTHER PUBLICATIONS

Patent Abstracts of Japan, vol. 16, No. 268, Publication No. JP4069622, Publication Date Mar. 4, 1992.

Patent Abstracts of Japan, vol. 17, No. 498, Publication No. JP5127195, Publication Date May 25, 1993.

Patent Abstracts of Japan, vol. 14, No. 59, Publication No. JP1283518, Publication Date Nov. 15, 1989.

Ueda et al., "A High–Aperture–Ratio TFT–LCD With a Shield–Electrode Structure", SID 93 Digest, 1993, pp.739–742.

Primary Examiner—William L. Sikes
Assistant Examiner—Tiep H. Nguyen
Attorney, Agent, or Firm—Cushman, Darby & Cushman IP Group of Pillsbury Madison & Sutro LLP

[57] ABSTRACT

In an active matrix type display device using TFTs as switching elements, in order to remarkably improve the aperture ratio and, at the same time, largely lower a dissipation power, an extending electrode is provided as one unit to a scanning line and light is shut off at those areas between a signal line and two display pixel electrodes situated adjacent the signal line, the two display pixel electrodes being arranged with the signal line interposed.

17 Claims, 9 Drawing Sheets

ACTIVE MATRIX TYPE DISPLAY DEVICE

TECHNICAL FIELD

The present invention relates to an active matrix type display device equipped with a display pixel electrode array using thin film transistors (referred to as TFTs) as switching elements.

BACKGROUND ART

An ordinary active matrix type liquid crystal display device has a basic structure including an array substrate and counter substrate with a liquid crystal sealed therebetween.

The array substrate includes a matrix array of display pixel electrodes formed on a light-transmitting substrate, such as glass, a plurality of scanning lines formed along rows of the pixel electrodes, a plurality of signal lines along columns of pixel electrodes, a plurality of TFTs connected to control these pixel electrodes according to voltage signals from corresponding scanning and signal lines, and a plurality of storage capacity lines each capacitively coupled to a corresponding pixel electrode via an insulating film.

The counter substrate includes counter electrodes formed on a light-transmitting substrate, such as glass and opposed to the matrix array of display pixel electrodes, and a black matrix for shielding light with respect to an area between the display pixel electrodes. In a case where the liquid crystal display device is used for color display, colored layers are formed on the counter substrate at those areas surrounded with the black matrix and corresponding to the display pixel electrodes.

The liquid crystal display device supplies a select pulse to one of the scanning lines sequentially from a top row on the screen and a non-select pulse to the other scanning lines. Each TFT is set in a conductive state by the select pulse applied from the corresponding scanning line only for a predetermined write period, during which a signal potential applied to the corresponding signal line is written into the corresponding pixel electrode. Further, each TFT is set in a nonconductive state by the non-select pulse applied from the corresponding scanning line only for a predetermined hold period, during which the potential written into the display pixel electrode is held. The hold period is equal to the time from the shutting of the select pulse until it is again applied. The transmittance of the liquid crystal varies in an area between the counter electrode and the display pixel electrode facing the counter electrode, with a difference between the potentials of these two electrodes. The liquid crystal display device two-dimensionally modulates light coming from a back light source by controlling the transmittance distribution of the liquid crystal on the basis of the arrangement of the display pixel electrodes to display an image whose brightness distribution depends upon the transmittance distribution of the liquid crystal.

The aperture ratio of each pixel is represented by the ratio of a light transmission area to the area of a drive circuit for the pixel. Conventionally, the aperture ratio was very low of the order of usually 30 to 40%. Therefore, it was difficult to achieve a desired maximum brightness for the modulated light passed through the liquid crystal display device. As a countermeasure, it may be possible to increase the amount of light emitted from the light source, but this leads to increasing the dissipation power.

It is accordingly the object of the present invention to provide an active matrix type display device which has excellent optical and electrical properties.

DISCLOSURE OF INVENTION

The present invention relates to an active matrix type display device. With the active matrix type display device of the present invention, a gap between the scanning line and the display pixel electrode corresponds to a noneffective pixel area and constitutes an area over which a drive control is not substantially exerted. It is, therefore, necessary that the light shielding means be provided on the light transmitting substrate to prevent light which comes from a light source from leaking toward an observer.

In order to improve the aperture ratio, it is only necessary that the light shielding area, that is, the noneffective pixel area, be made small. To this end, it is better to bring the signal line and display pixel electrode closer to each other.

A capacitive coupling is present between the signal line and the display pixel electrode and, due to this capacitive coupling, the display pixel electrode potential varies incessantly by a continuing variation of a potential on the signal line. If the signal line and display pixel electrode are brought simply nearer to each other, then the potential variation becomes excessively great and there is a risk that a desired display not be obtained.

According to the present invention, the extending electrode extends from the scanning line and is arranged to overlap with the signal line and display pixel electrode with the gate insulating film interposed therebetween.

According to the structure above, the extending electrode is set to a scanning line non-select potential during most of the period in which the display device is driven. The presence of the overlapped areas between the signal line and display pixel electrode ensures electric shielding relative to the electrodes. This leads to alleviating the capacitive coupling between the signal line and the display pixel electrode and hence to remarkably enhance the allowance with which these pixel electrodes are brought nearer to each other.

In the arrangement shown, since the extending electrode normally receives the same signal as that of the scanning line, attention has been paid to the necessity to consider an effect over the operation of TFT. That is, by newly providing such an extending electrode, the capacitive coupling between the scanning line and extending electrode and the counter electrode tends to increase by that area. When the coupling capacity becomes excessively large, the time constant of the scanning line is increased and scanning pulse is deformed. When the pixel is far away from the feeding terminal of the scanning pulse, then the pulse is deformed correspondingly. Thus, there is a risk that the select time of TFT will be shorter than a predetermined time or no normal operation will be produced and hence no desired potential will be written into the display pixel electrode.

According to the present invention, however, the extending electrode is overlapped with the signal line and a display pixel electrode is provided on the substrate side with the gate insulating film interposed therebetween. That is, at this area between the extending electrode and the counter electrode there exists a series capacitance of the liquid crystal capacitance and gate insulating film's capacitance so that it is possible to largely reduce the capacitive coupling between the counter electrode and the scanning line and extending electrode.

The overlapped area of the present invention means that it may have an area adequate to cause no malfunction of the device even with the overlapped area of the electrodes and that it is not necessarily required to be provided completely over those areas of interest. For example, the extending electrode and display pixel electrode may be overlapped to an extent that the full end portion of the display pixel electrode is overlapped with a portion of the end of the extending electrode or vice versa. Further, the portion of the end of the extending electrode may be provided so as to be overlapped with the portion of the end of the display pixel electrode.

BEST MODE OF CARRYING OUT THE INVENTION

An active matrix type liquid crystal display device according to one embodiment of the present invention will be explained below with reference to the accompanying drawings.

Figure 1:
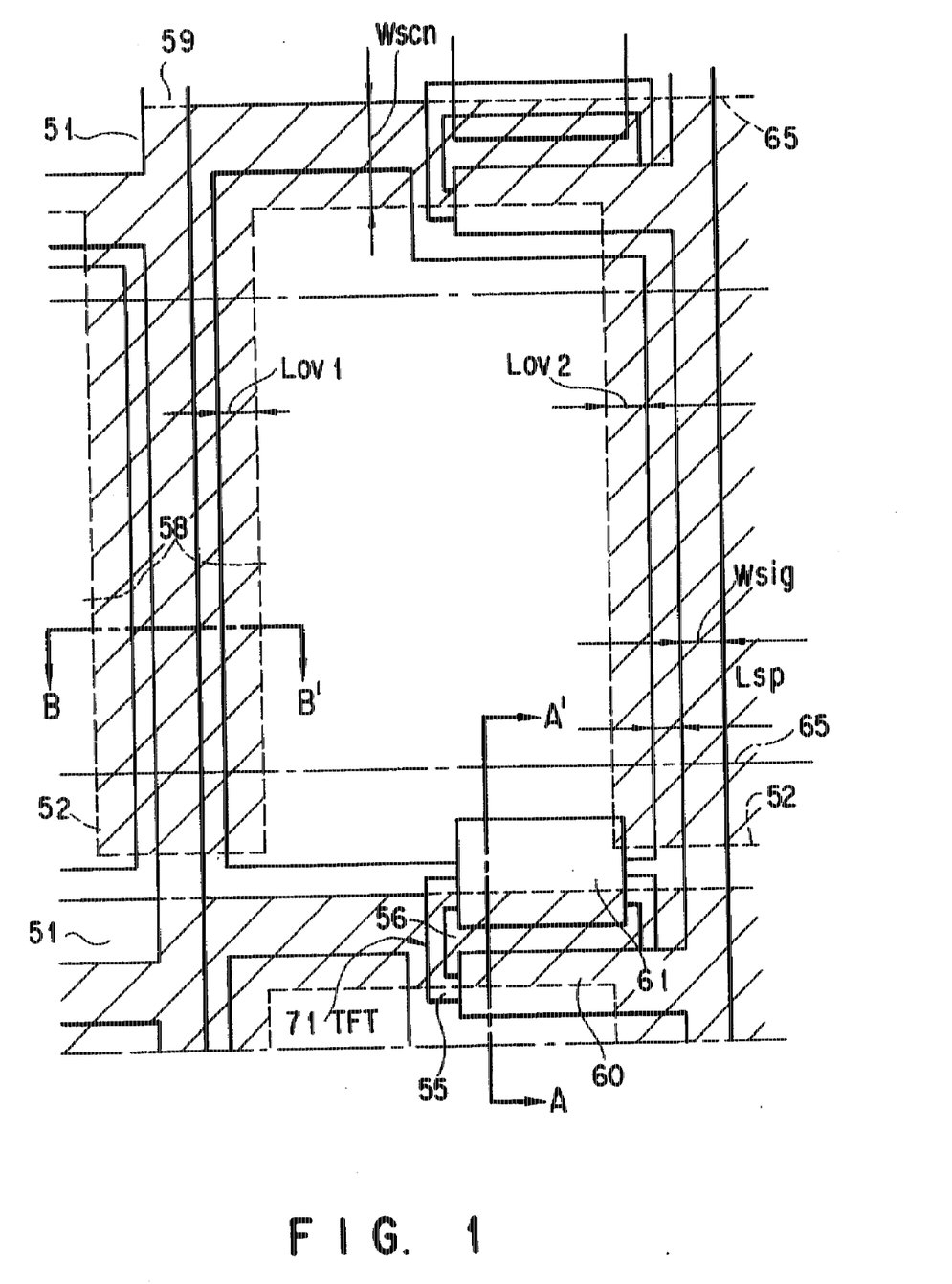
FIG. 1 is a plan view showing one pixel and its peripheral area in an active matrix type liquid crystal display device according to one embodiment of the present invention.
Figure 2:
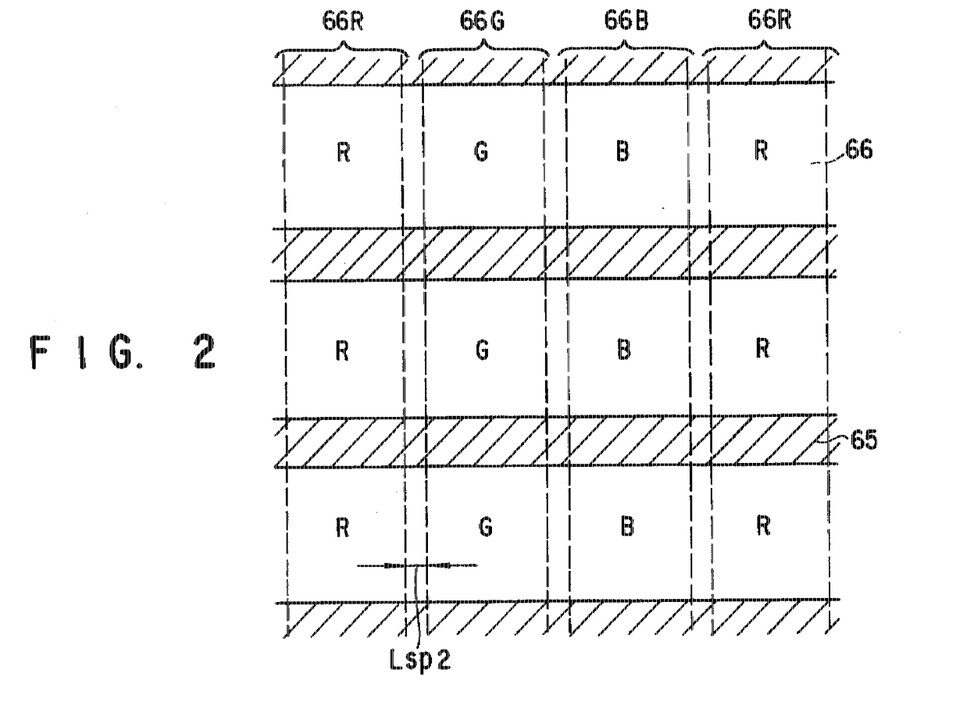
FIG. 2 is a plan view showing a counter substrate of the active matrix type liquid crystal display device.
Figure 3:
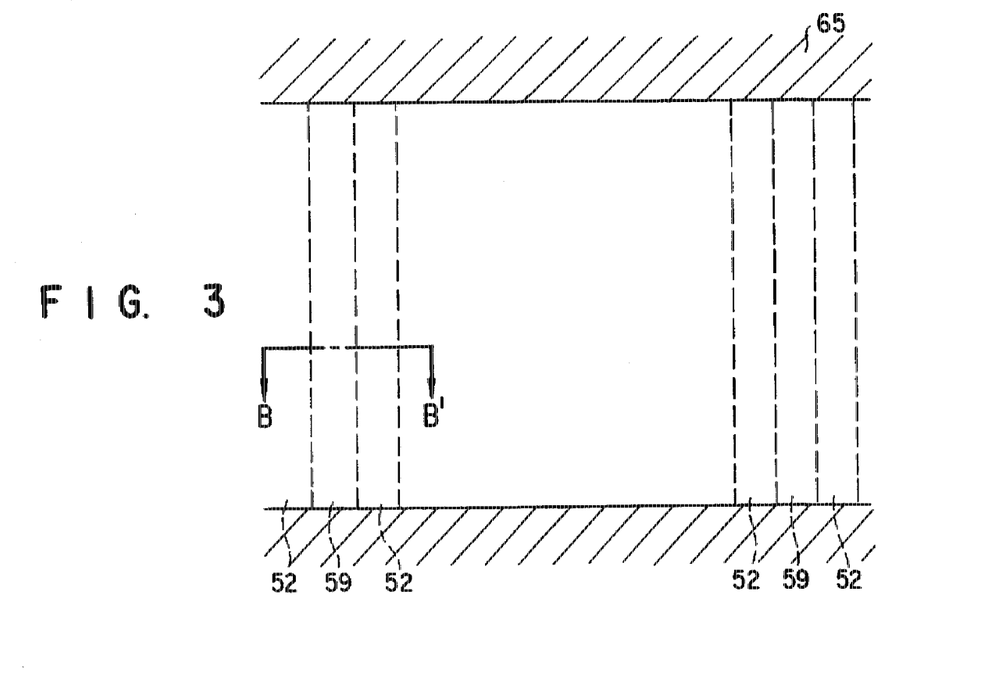
FIG. 3 is a view showing a flat surface area left as a pixel without involving the shielding of light in the active matrix type liquid crystal display device.
Figure 4:
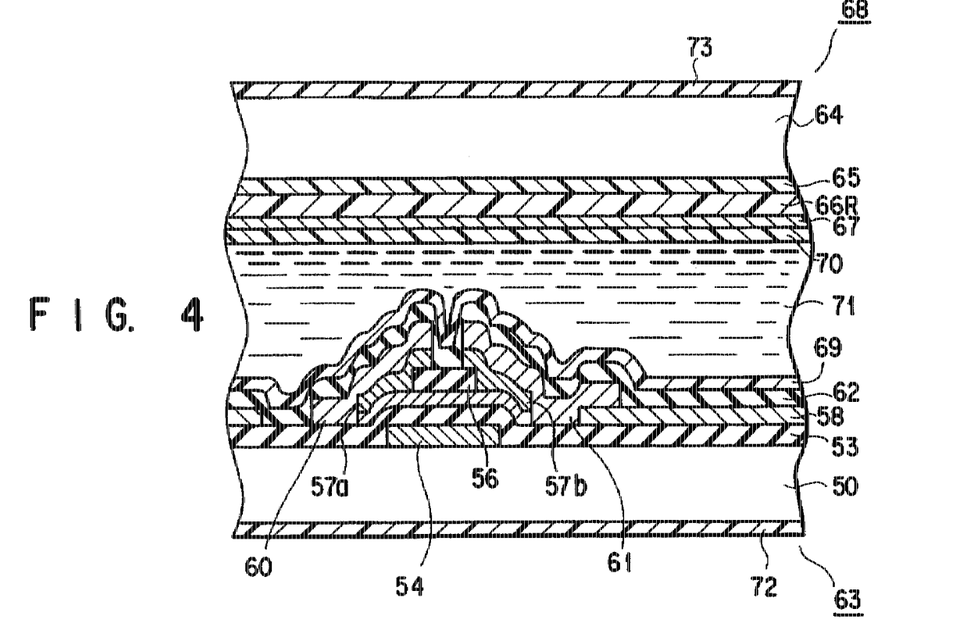
FIG. 4 is a cross-sectional view, taken along line A----A' in FIG. 1, showing the active matrix type liquid crystal display device.
Figure 5:
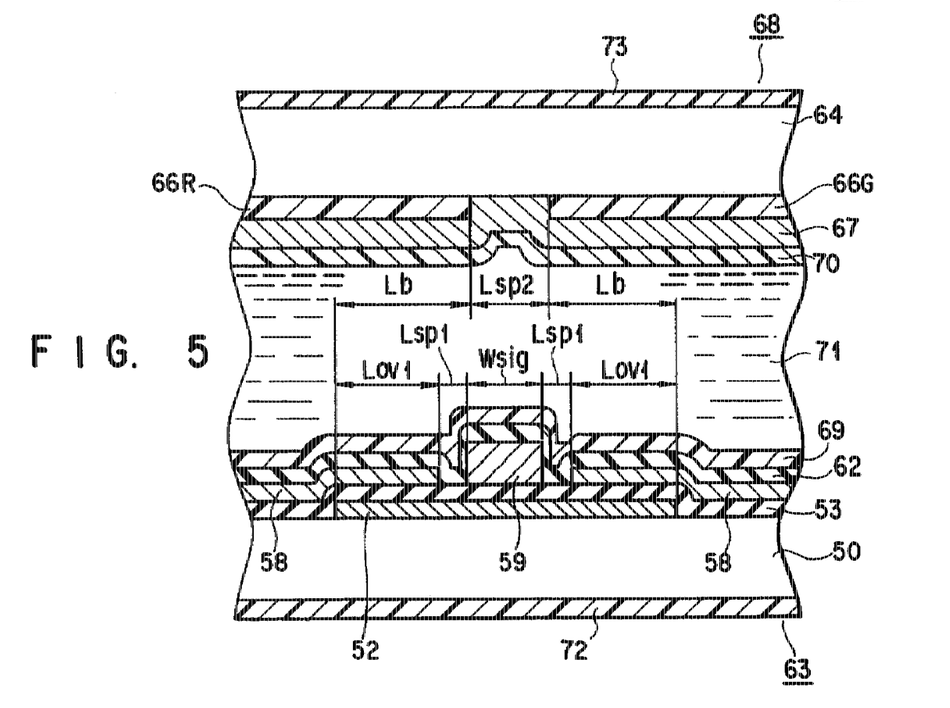
FIG. 5 is a cross-sectional view, taken along line B----B' in FIG. 1, showing the active matrix type liquid crystal display device.

FIG. 1 shows a plane structure of one pixel and its peripheral area of a liquid crystal display device. FIG. 2 is a plan structure of a counter substrate of the liquid crystal display device. FIG. 3 shows a plane surface of left as a pixel without involving the shielding of light in the liquid crystal display device. FIG. 4 shows a cross-sectional structure of the liquid crystal display device, taken along line A----A' in FIG. 1. FIG. 5 shows a cross-sectional structure of the liquid crystal display device, taken along line B----B' in FIGS. 1 and 3.

The liquid crystal display device is constructed as to be basically similar in structure to a conventional device. As shown in FIGS. 1, 4 and 5, an array substrate 63 has a scanning line 51 and signal line 59 which are formed over one major surface of a light-transmitting substrate 50 via a gate insulating film 53 and arranged in a mutually orthogonal relation to each other. The widths Wscn and Wsig of the scanning line 51 and signal line 59 are set to be, for example, 14 μm and 5 μm, respectively.

A display pixel electrode 58 is provided at an area defined by the scanning line 51 and signal line 59. A distance Lsp1 at a parallel area between the signal line 59 and the display pixel electrode 58 is set to be, for example, 3 μm.

The above scanning line 51 extends beneath the signal line 59 with the gate insulating film 53 interposed to provide an extending electrode (light shielding electrode) 52. The extending electrode 52 is formed to cover a gap between those adjacent two display pixel electrodes 58 such that the signal line 59 is interposed therebetween. The electrode 52 has a width of 19 μm. That is, the electrode 52 is so arranged as to overlap with these adjacent two display pixel electrodes 58 to an extent corresponding to a predetermined width Lov1 of for example, 4 μm.

As shown in FIG. 1, the two extending electrodes 52 are provided one on each side of the display pixel electrode 58 and, each, have an overlapped area substantially equal in length to the display pixel electrode 58.

A TFT 71 is a switching element for driving and controlling the display pixel electrode 58 and provided just above the scanning line 51. That is, TFT 71 has a laminate structure in which its gate electrode 54 is constituted by part of the scanning line 51, a semiconductor layer 55 is formed over the gate electrode 54 via a gate insulating film 53, a source electrode 61 and drain electrode 60 are formed over the semiconductor layer 55 via a protective insulating film 56, and the drain electrode 60 is constituted by part of the signal line 59.

A channel region of TFT 71 is so formed as to be within an boundary of the scanning line 51. The length L of the channel region is represented by a shortest distance from a contact area between the source electrode 61 and the semiconductor layer 55 to a contact area between the drain electrode 60 and the semiconductor layer 55 and, in this embodiment, set to be 12 μm. Further, the width W of the channel region is represented by a length between the end of the source electrode 61 and the opposed end of the drain electrode 60 and set to be 30 μm.

As shown in FIGS. 2 and 4, a counter substrate 68 has a 40 μm-wide light shielding layer 65 formed on one major surface of the light transmitting substrate 50 and extending in a row direction along the scanning line 51 formed on the array substrate 63 side, and red (R)-, green (G)- and blue (B)-colored layers 66 extending in a column direction orthogonal to the light shielding layer 65 and provided as a 97 μm-thick stripe each. Those adjacent two colored layers 66 are spaced by a distance Lsp2 of, for example, 3 μm. The counter substrate 68 has a counter electrode 67 formed on the colored layers 66 and an alignment film 70 formed to cover the whole surface of the counter electrode 67. As shown in FIG. 5, the colored layers 66 are mutually separated at an area facing the signal line 59 on the array substrate 63 side.

As shown in FIG. 3, an aperture of one pixel is defined by the light shielding layers 65 arranged in a row direction and extending electrodes 52 and signal electrodes 59 arranged in a column direction.

In a plane horizontal to each substrate, a distance Lb is set between the end of the extending electrode 52 and the end of the colored layer 66 and given by:

$$2 \cdot Lb = Ltb - Lsp2 \quad (1)$$
$$= (2 \cdot Lov1 + 2 \cdot Lsp1 + Wsig) - Lsp2$$

The method for manufacturing the above-mentioned active matrix type liquid crystal display device will be explained below.

A Ta film of a light-transmitting material is formed, as a 3000 Å-thick layer, on one major surface of a light-transmitting glass substrate 50 by a sputtering method and a resultant semiconductor surface is photo-etched to a predetermined pattern to provide a scanning line 51 as well as a gate electrode 54 and extending electrode 52 constituting part of the scanning line 51. In order to cover these electrodes, a 3500 Å-thick SiOx film is deposited by a plasma CVD method on a resultant semiconductor structure to provide a gate insulating film 53.

Then an i type hydrogenated amorphous silicon (hereinafter referred to as an a-Si:H) layer and SiNx layer are sequentially formed as 500 Å- and 2000 Å-thick layers, respectively, with the use of a plasma CVD method. The SiNx layer is photoetched to a predetermined pattern to provide a protective insulating film 56. Then a 500 Å-thick n type a-Si layer is formed by the plasma CVD method on the resultant semiconductor structure. The n type a-Si:H layer and i type a-Si:H layer are photoetched to a predetermined pattern to provide a semiconductor layer 55 and ohmic layers 57a and 57b.

Then a 1000 Å-thick ITO film is deposited by a sputtering method on the resultant semiconductor structure and photoetched to a predetermined pattern to provide a display pixel electrode 58. A 700 Å-thick Mo film and 3500 Å-thick Al film are deposited on the semiconductor structure by the sputtering method and photoetched to a predetermined pattern to provide a signal lines 59, drain electrode 60 and source electrode 61. Finally, an SiNx film is deposited, as a protective insulating film 62, on the whole surface by the plasma CVD method to provide a desired array substrate 63.

On the other hand, a 0.1 μm-thick Cr film is deposited by the sputtering method on one major surface of a light-transmitting glass substrate 64 and photoetched to a predetermined pattern to provide a light shutting layer 65. Colored layers 66 of R, G and B are formed on those areas isolated by the light shutting layer. The colored layers 66 may be provided by photoetching, at those desired areas, a layer of a photosensitive resist dispersed with R, G and B pigments.

Further, a layer of a binder resin dispersed with the pigments may be formed at those desired areas by a printing transfer. In this embodiment, each colored layer 66 was provided by forming a 1.2 μm-thick layer of a photosensitive resist dispersed with pigments and photoetching the layer. Further, a 1500 Å-thick counter electrode 65 made of ITO is formed on the surface by the sputtering method, thus obtaining a counter substrate 68.

A low temperature curing type polyimide film is print-coated on a whole electrode formation surface of the thus-obtained array substrate 63 and counter substrate 68. By a rubbing process a predetermined-direction alignment is imparted to the polyimide film to provide alignment films 69 and 70. The array substrate 63 and counter substrate 68 are so joined as to have their alignment directions nearly 90° set relative to each other. By doing so, a liquid crystal cell is provided. At that time, the positional alignment of the array substrate 63 and counter substrate 68 is made by utilizing their alignment marks initially provided in a predetermined position on these substrates, that is, in their insulating substrate states. Then a liquid crystal material is filled into the liquid crystal cell. Polarizing plates 73 and 74 are attached to the outer surfaces of the array substrate 63 and counter substrate 68, thus completing an active matrix type liquid crystal display device of this embodiment.

The operation of the active matrix type liquid crystal display device will be explained below.

Figure 6:
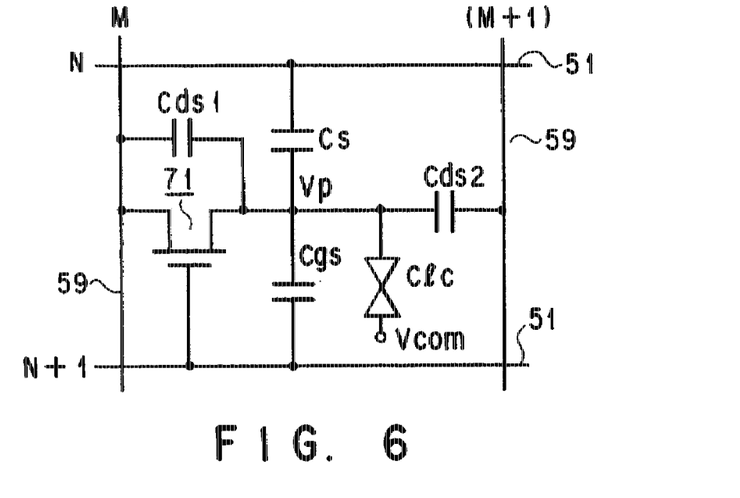
FIG. 6 is an equivalent circuit diagram of the active matrix type liquid crystal display device.

FIG. 6 shows an equivalent circuit of each pixel of the active matrix type liquid crystal display device. The equivalent circuit has a storage capacitance Cs created by a capacitive coupling of the display pixel electrode 58 and extending electrode 52, capacitances Cds1 and Cds2, one of which is created by the capacitive coupling of the display pixel electrode 58 and signal line adjacent to one side of the electrode 58 and the other created by the display pixel electrode 58 and signal line adjacent to the other side of the electrode 58, a capacitance Cgs created by the capacitive coupling of the gate electrode 54 and source electrode 61, and a liquid crystal capacitance Clc created by the capacitive coupling of the display pixel electrode 58 and counter electrode 67 via the liquid crystal cell 72.

Figure 7:
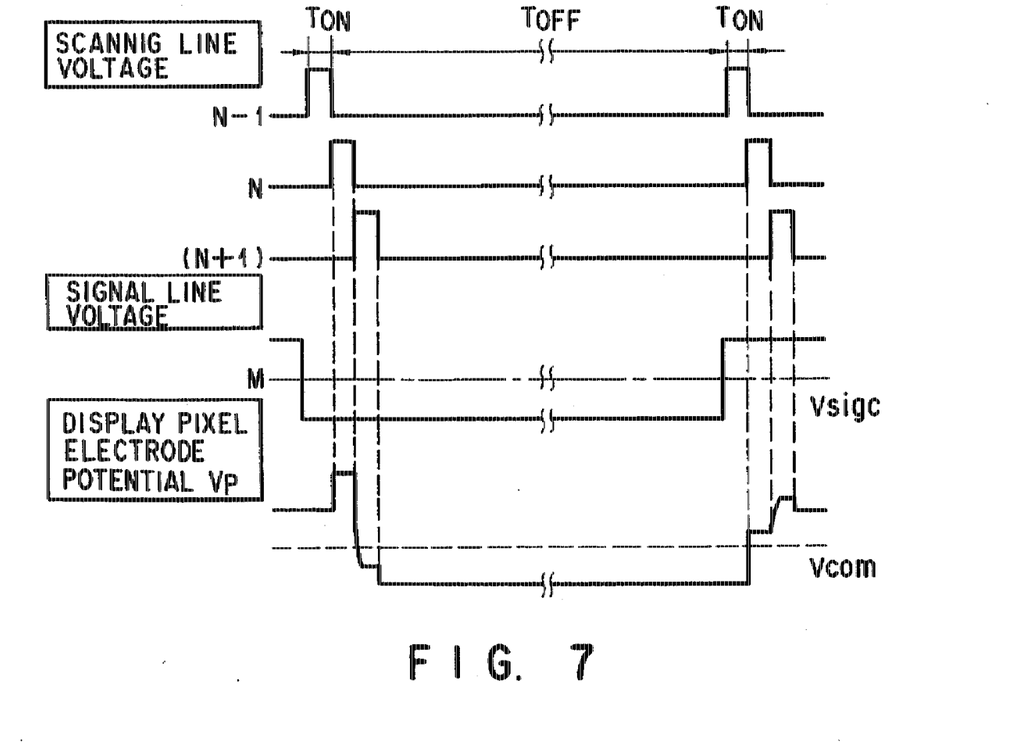
FIG. 7 is a time chart showing one example of drive waveforms of the active matrix type liquid crystal display device.

FIG. 7 shows, by way of example, the drive waveforms of the active matrix type liquid crystal display device. The liquid crystal display device supplies a select pulse (select voltage) to one of the scanning lines 51 sequentially from a top row on the screen and supplies a non-select pulse (non-select voltage) to the remaining scanning lines 51. For the respective scanning lines 51, the select voltage continues only during a write period Ton equal to one scanning period of an image varying for each frame and the non-select voltage only during a hold period Toff equal to a period from the shutting off of the select voltage to the reapplication of it. On the other hand, the liquid crystal display device supplies, to the signal line 59, an image signal corresponding to one line per horizontal scanning cycle. The polarity of one image signal is inverted, for each predetermined period, for example, each frame, with a voltage Tsigc used as a reference.

A potential Vp of the display pixel electrode 58 is set to a level, at a period Ton, corresponding to a signal line voltage and maintained at a period Toff to that potential level. The display pixel electrode 58 is placed in a state to be capacitively coupled as the capacitance Cs to the extending electrode 52 constituting part of the scanning line 51 supplied with the select voltage at the period Toff, thereby preventing a potential Vp from largely varying during the period Toff.

Further, the light transmittance of the liquid crystal cell 71 varies in accordance with a potential difference between a potential Vcom on the counter electrode 67 and a potential Vp on the display pixel electrode 58 at the respective pixel areas whereby an image is displayed.

With the active matrix type liquid crystal display device of this embodiment, the pixel aperture ratio was found to be 70% and the utilization efficiency of source light was remarkably enhanced compared with a conventional liquid crystal display device. It is possible to obtain a better display image without the light passing through an area between the pixel electrodes 58.

That is, during the hold period, the display pixel electrode 58, being affected by a potential variation on the signal line 59, suffers a variation at one horizontal scanning cycle. Since the potential variation on the signal line 59 depends upon the image information, it is difficult to equally compensate the potential variations of the display pixel electrodes 58. In contrast, the potential on the scanning line 51 is set to a non-select level during the hold period and a potential variation of the display pixel electrode by the scanning line 51 is at a nearly constant level and can be compensated by, for example, the counter electrode potential.

According to this embodiment, taking the above into consideration, the extending electrode 52 is provided in a way to correspond to those parallel portions of the signal line 59 and display pixel electrode 58 and those overlapped portions of a given length are provided on the extending electrode 52 as the portions overlapped with the signal line 59 and display pixel electrode 58. According to this structure, it is possible for the extending electrode 52 to electrically shield the display pixel electrode 58 from the signal line 59. Thus it is possible to largely alleviate the potential variation of the display pixel electrode 58 and hence to bring the signal line 59 and display pixel electrode 58 into proximity to each other.

However, there is a risk that the coupling capacitance between the scanning line 51 and the counter electrode 67 will be increased by the provision of the extending electrode 52. As the coupling capacitance becomes too great, the time constant of the scanning line 51 is raised whereby deformation occurs in the select pulse on the scanning line. The deformation of the pulse becomes prominent as the pixels are further away from the end from which the select pulse is supplied. If this happens, the turn-ON time of TFT is shorter than a predetermined write time or TFT fails to properly operate, there being a risk that no desired potential will be written into the display pixel electrode 58.

According to the present invention, however, between the substrate 50 and the gate insulating film 53, the extending electrode 52 is provided in a position to correspond to the signal line 59 and display pixel electrode 58. That is, the extending electrode 52 is located on a side remote from the counter electrode 67. This is done so that the capacitance between the extending electrode 52 and the counter electrode 67 may be determined by a series capacitance of the liquid crystal capacitance and gate insulating film's capacitance. It is possible to largely decrease the coupling capacitance between the counter electrode 67 and the scanning line 51 and extending electrode 52.

According to this embodiment, the relative inductivity of the liquid crystal capacitance was about 3.5 to 8. When calculation is made by applying these to the actual operation condition of the liquid crystal display device, it has been found that the coupling capacitance can be about 10% decreased compared with the case where a liquid crystal display device is manufactured without interposing any insulating film on the extending electrode 52. This leads to obtaining a very great advantage.

If use is made of any structure according to the present invention, it has been found possible to adequately drive an active matrix type liquid crystal display device of a type having over 1920 signal lines and a great capacitance for the signal lines. That is, a driving method has been known according to which, when the liquid crystal unit is to be driven, a signal input to a signal line is converted with a predetermined period to an AC form and an AC drive is done such that the potential of the counter electrode, being in synchronism with a potential on the signal line, is polarity-reversed. According to the driving method, it is possible to lower the withstand voltage of a signal line driving circuit and to advantageously lower the cost of the display device.

If a capacitance imparted to the counter electrode becomes too great when the electrode is AC driven, the time constant of the counter electrode becomes great, thus causing deformation of the drive signal of the counter electrode. As the pixel is further away from the supply terminal relative to the counter electrode, an adequate potential fails to be written into the liquid crystal pixel. There is a risk that an uneven display will be produced.

With the structure of this embodiment, it is possible to lower the coupling capacitance between the counter electrode and the scanning line and extending electrode, so that it contributes much to lowering the above-mentioned uneven display. This effect is prominent, in particular, in the case where the polarity-reversed period of the drive signal is shortened to, for example, one horizontal scanning period unit.

With this embodiment, since the extending electrode 52 constitutes a structure integral with the scanning line 51, it is possible to omit occupation space of main supply lines and isolation space of the scanning line 51 relative to the main supply lines which would otherwise be required in the case where the main supply lines for supplying voltage to the extending electrode 52 are provided independent of the scanning line 51. Further, the extending electrode 52 is maintained, at the same predetermined potential as that on the scanning line, during most hold period, so that the capacitive coupling of the signal line 59 and display pixel electrode 58 is alleviated and that the signal line 59 and display pixel electrode 58 are brought into proximity to each other. The extending electrode 52 is so provided as to cover an area between the mutually near display pixel electrodes 58 and signal line 59. This arrangement can largely reduce an area as a light shutting layer and largely improve the aperture ratio of the pixel.

The improvement of the aperture ratio will be explained in more detail below.

For the active matrix type liquid crystal display device it is known that "tilt reversing" occurs, a phenomenon that a liquid crystal material located near the pixel takes an abnormal alignment. According to the present invention, it is possible to completely conceal such "tilt reversing" along the direction of the signal line and to gain a better display quality. That is, by the "tilt reversing" phenomenon is meant that the liquid crystal material located near the pixel is arranged along an electric field direction and, its being varied from an initial normal alignment direction to its reversed direction, light leaks at its normal/reverse boundary area.

According to this embodiment, the tilt reversed area can be completely concealed by properly adjusting an overlapped area of the display pixel electrode and extending electrode 52. The extending electrode 52 is set at a non-select potential, that is, nearly 0 V, of the normal scanning line 51 and the display pixel electrode 58 is set at a signal potential of, for example, 6 V±3 to 5 V. In this case it is surmised that an electric field is created also between the extending electrode 52 and the display pixel electrode 58 and an electric field coming from the extending electrode 52 passes through a gap between the display pixel electrode 58 and the signal line 59 to produce a new tilt reversing phenomenon. If, however, a tilt-reversed area produced near the signal line 59 is concealed, the liquid crystal cell 71 at an effective display area inside the extending electrode 52 edge is directly governed by the electric field between the display pixel electrode 58 and the counter electrode 67, thus regaining its initial alignment direction. That is, this liquid crystal cell 71 is not adversely affected at the effective pixel area directly by the extending electrode 52 and new tilt reversing is prevented from being generated at the effective pixel area.

Since, in this case, the tilt-reversed area created between the signal line 59 and the display pixel electrode 58 can be concealed without providing any independent light shielding means, the extending electrode 52 can contribute much to improving the aperture ratio. With the active matrix type liquid crystal display device, no tilt reversing along the signal line direction has been observed.

In the structure of this embodiment, the extending electrode 52 is set to a width able to conceal the tilt-reversed area. It is good to determine the width of the scanning line 51 substantially according to the width of the extending electrode 52, but it is better to determine the width of the scanning line 51 as being smaller than the width of the extending electrode 52.

The operation speed of TFT 71 is improved by shortening the channel length of TFT 71 laid over the scanning line 51. If, however, the channel length alone becomes shorter without varying the width of the scanning line 51, then the overlapped area of the source electrode 51 and scanning line 51 is increased and there is also an increase in the parasitic capacitance between these electrodes. An amount of potential variation, $\Delta Vp$, of the display pixel electrode 58 is increased with an increase of the parasitic capacitance. Since in the present embodiment the width of the scanning line 51 is made smaller than that required of the extending electrode 52, the channel length becomes smaller without increasing the above-mentioned parasitic capacitance, thus improving the operation speed of TFT 71. When this structure was applied to a display device having 1920 signal lines, it is possible to obtain an ON current adequate to drive the display device.

When the potential on the scanning line is switched from the select potential to the non-select potential, the potential of the display pixel electrode undergoes a potential variation by the capacitive coupling of the scanning line 51 and display pixel electrode 58. The potential variation value $\Delta Vp$ is represented by $$\Delta Vp = (Cgs/Cl) \cdot \Delta Vg$$

where $$Cl = Cgs + Clc + Cs + Cdsl + Cds2$$

$\Delta V$: the potential difference between the select- and non-select potentials applied to the scanning lines.

The potential variation value, $\Delta Vp$, can be compensated by properly setting the capacitance Cs between the extending electrode 52 and the display pixel electrode 58.

According to this embodiment, an N-th row of the scanning line 51 is provided integral with the extending electrode 52. This extending electrode 52 constitutes an N+1-th row display pixel electrode 58 and capacitance Cs. The potential of the display pixel electrode 58 varies when a select potential is applied to the N-th row scanning line. Thereafter, the select voltage is applied to the N+1-th row scanning line 51 and an image signal from the signal line 59 is written into the N+1-th row display pixel electrode 58. The potential of the N-th extending electrode 52 does not vary during a hold time period until the select voltage is again applied to the N-th row scanning line 51. Thus the time in which a normal image signal is held on the display pixel electrode 58 substantially coincides with the hold time. The transmittance of the liquid crystal cell 72 varies in accordance with the effective value of an application voltage and the display image is subject to almost no influence because the potential of the display pixel electrode 58 varies with the potential of the extending electrode 52.

With this embodiment, the channel region of TFT 71 is so formed as to be situated within the contour of the scanning line 51. The position of the channel region imparts no restriction to the overlapped structure of the extending electrode 52 relative to the display pixel electrode 58 and signal line 59, thus contributing much to improving the aperture ratio.

With this embodiment, two extending electrodes 52 are positioned one at each side of the display pixel electrode 58. These provide the overlapped areas substantially equal in length to the signal line 59 and display pixel electrode 58. Even if, therefore, any positional displacement is produced relative to the display pixel electrode 58 in the longitudinal direction of the extending electrode 52, the capacitive couplings of the right and left signal lines 59 and display pixel electrodes 58 are placed in substantially equal states at all times. This structure is particularly suitable when the so-called "V line reversing drive" is applied thereto.

The "V line reversing drive" is of such a type that, with respect to the mutually adjacent signal lines, the application voltage is placed in a reverse-polarity relation to the center potential on the signal line. This driving system has the following advantage. That is, although the display pixel electrode undergoes a variation during the hold period by the capacitive coupling to the signal line as set out above, even if the potential of the display pixel electrode varies toward a positive polarity side by one of both signal lines adjacent to that display pixel electrode, the other signal line allows the potential of the display pixel electrode to vary toward a negative polarity side, a state in which the above-mentioned variation is apparently canceled. In this connection it is to be noted that the respective capacitances on the right and left sides of the display pixel electrode, being not balanced, impairs such cancellation effect. With this embodiment, since the overlapped areas of the extending electrodes relative to the corresponding signal electrodes and display pixel electrodes are made substantially mutually equal on the right and left sides of the display pixel electrode, so that the capacitances created near the pixel are balanced and hence the above-mentioned cancellation effect is not impaired. According to the present invention, in addition to the basic pixel structure capable of reducing the capacitive coupling of the signal line 59 and display pixel electrode 58, it is also possible to suppress a potential variation of the display pixel electrode during the hold period, so that it is possible to obtain a very good display quality.

With the active matrix type liquid crystal display device of this embodiment, the assembling allowance of the array substrate and counter substrate is defined by a horizontal distance of the extending electrode end on the array substrate and colored layer end on the counter substrate.

Figure 11:
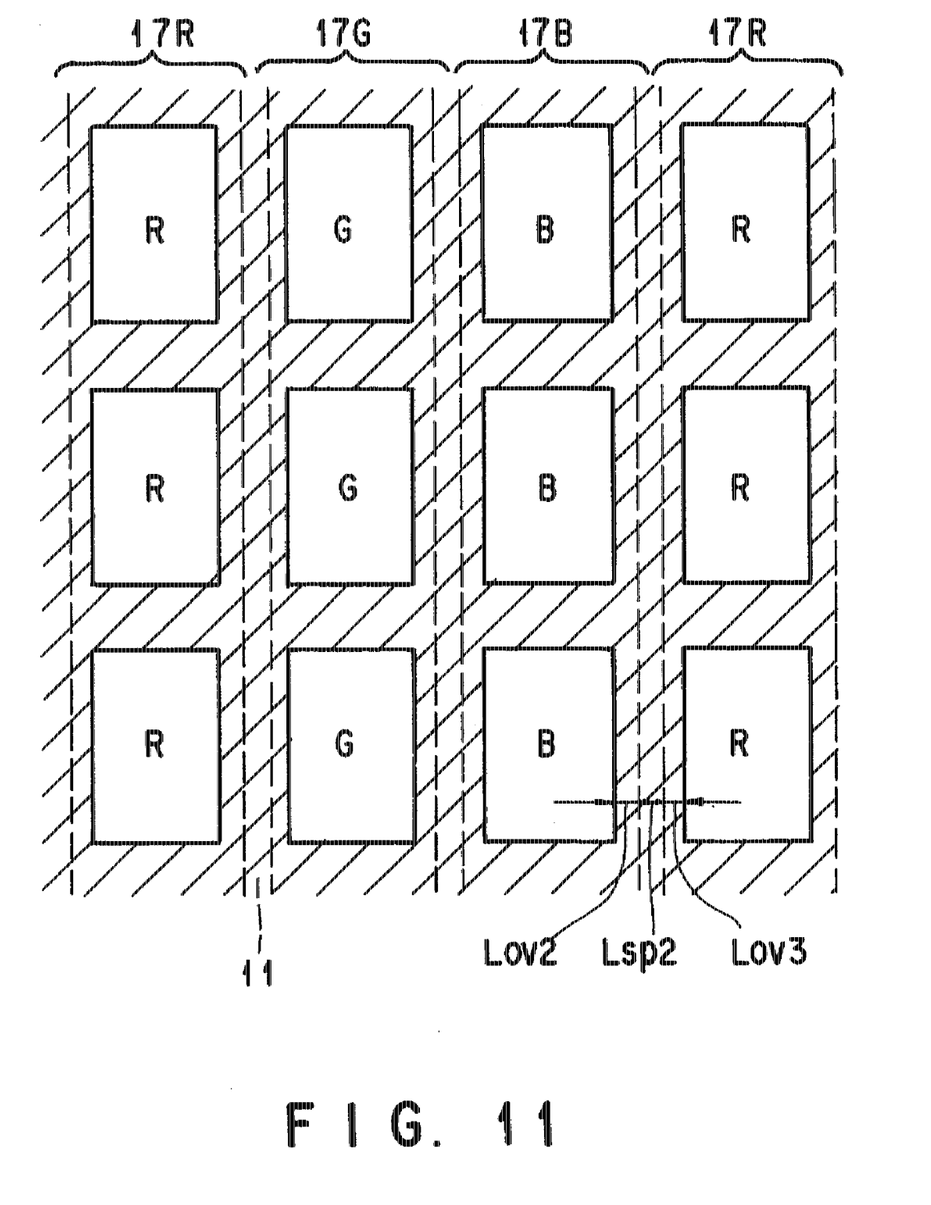
FIG. 11 is a plan view showing an active matrix type liquid crystal display device for the sake of comparison.
Figure 12:
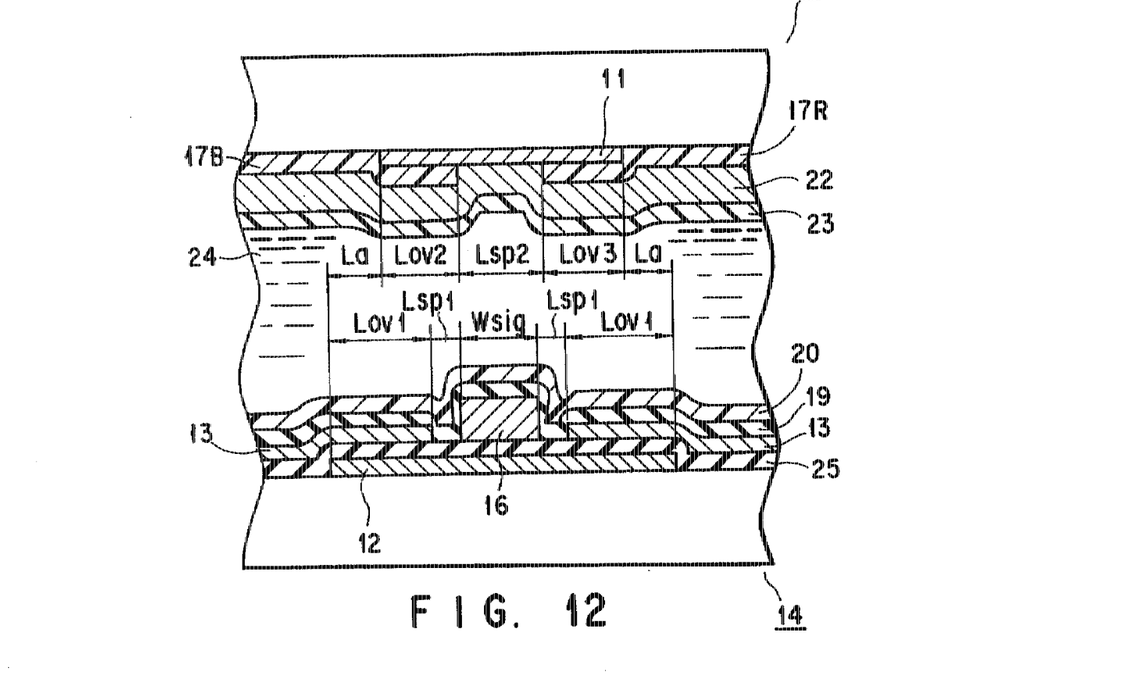
FIG. 12 is a cross-sectional view showing one pixel and its peripheral area of the active matrix type liquid crystal display device shown in FIG. 11.

The advantage of this embodiment will be explained below in conjunction with a liquid crystal display device for the sake of comparison, which is obtained by assembling an array substrate 14 and counter substrate 15 equipped with a black matrix 11 and colored layers 17 as shown in FIGS. 11 and 12.

With this embodiment, as set out above, the distance Lb between the end of the extending electrode 52 of the array substrate 63 and the end of the colored layer 66 is represented by the equation (1) below:

$$2 \cdot Lb = Lzb - Lsp2 \qquad (1)$$
$$= (2 \cdot Lov1 + 2 \cdot Lsp1 + Wsig) - Lsp2$$

In the device for the sake of comparison, with the widths of those overlapped areas between the black matrix 11 and the colored layer 17 represented by Lov2 and Lov3 and the distance between the end of a light shielding layer 12 and the end of the black matrix 11 represented by La, $$2 \cdot La = Lta - Lca \qquad (2)$$
$$= (2 \cdot Lov1 + 2 \cdot Lsp1 + Wsig) - (Lsp2 + Lov3 + Lsp2)$$

Substituting Lov1=4 μm, Lsp1=3 μm, Wsig=5 μm, Lsp2=3 μm and Lov2=Lov3=4 μm into the equations (1) and (2) gives Lb=8 μm from the equation (1) and
La=4 μm from the equation (2).

These values Lb and La denote the manufacturing allowance in the positional alignment of the array substrate 63 and counter substrate 68. From this, it is found that this embodiment largely improves the manufacturing allowance as compared with with the device for comparison. If the aperture ratio of the same extent is to be realized, it is possible according to the liquid crystal display device of this embodiment to manufacture liquid crystal display devices in higher yield while ensuring a very high allowance for a positional misalignment of the array substrate and counter substrate. Although, in the device for comparison, it may be considered that Lov2 and Lov3 be made small, this leads eventually to a decline in the manufacturing allowance of the counter substrate.

With this embodiment, light was shut off by the extending electrode 52 and light shutting layer 65 at the area between the pixels and it was found possible to obtain a liquid crystal display device which, realizing a high aperture ratio, involves no light leakage from the area between the pixel and the pixel. It is also found possible to interrupt an entry of external light into the channel region of TFT 71 and to obtain better switching characteristic.

Figure 8:
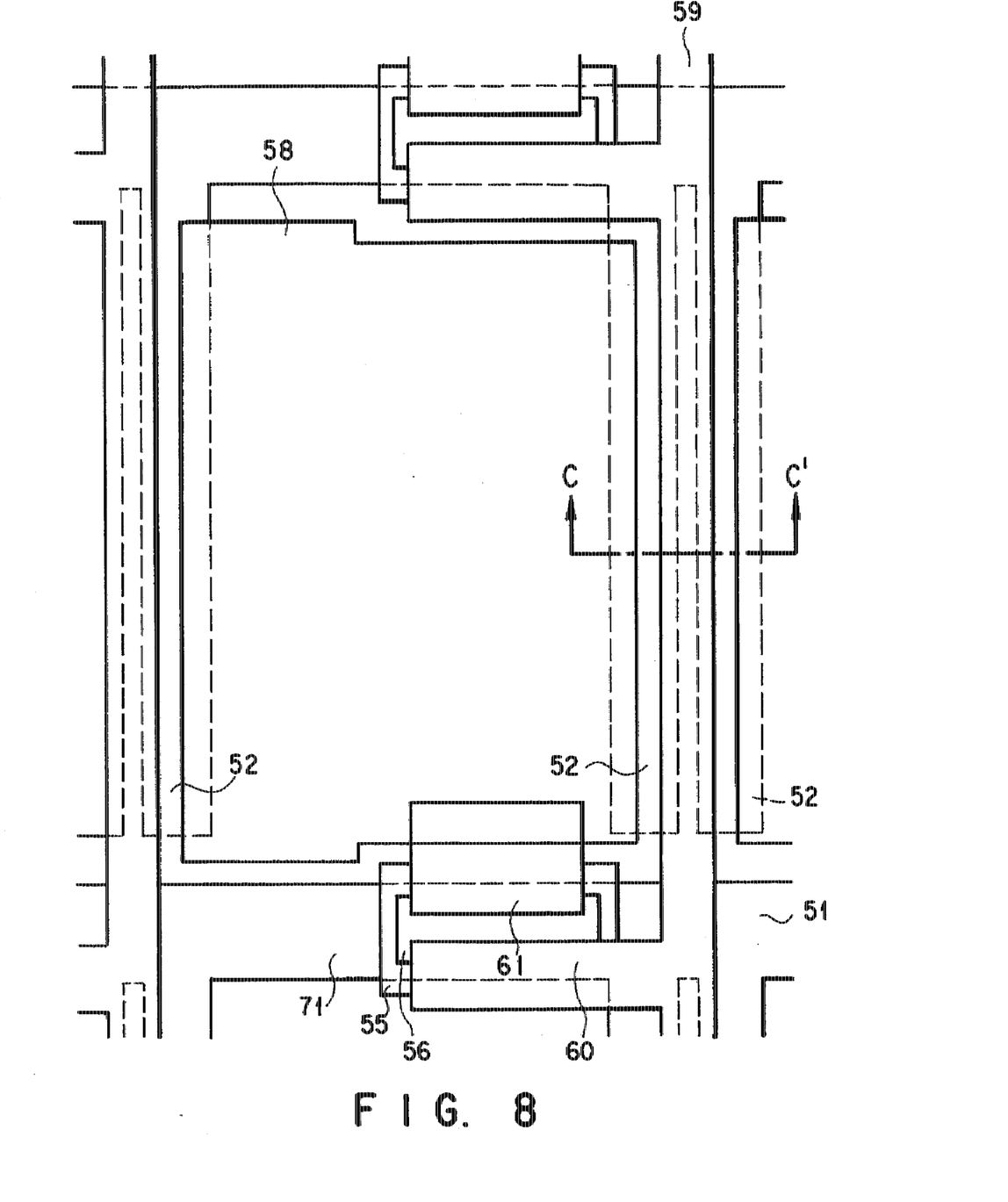
FIG. 8 is a plan view showing one pixel and its peripheral area in a first modification of the active matrix type liquid crystal display device in FIG. 1.
Figure 9:
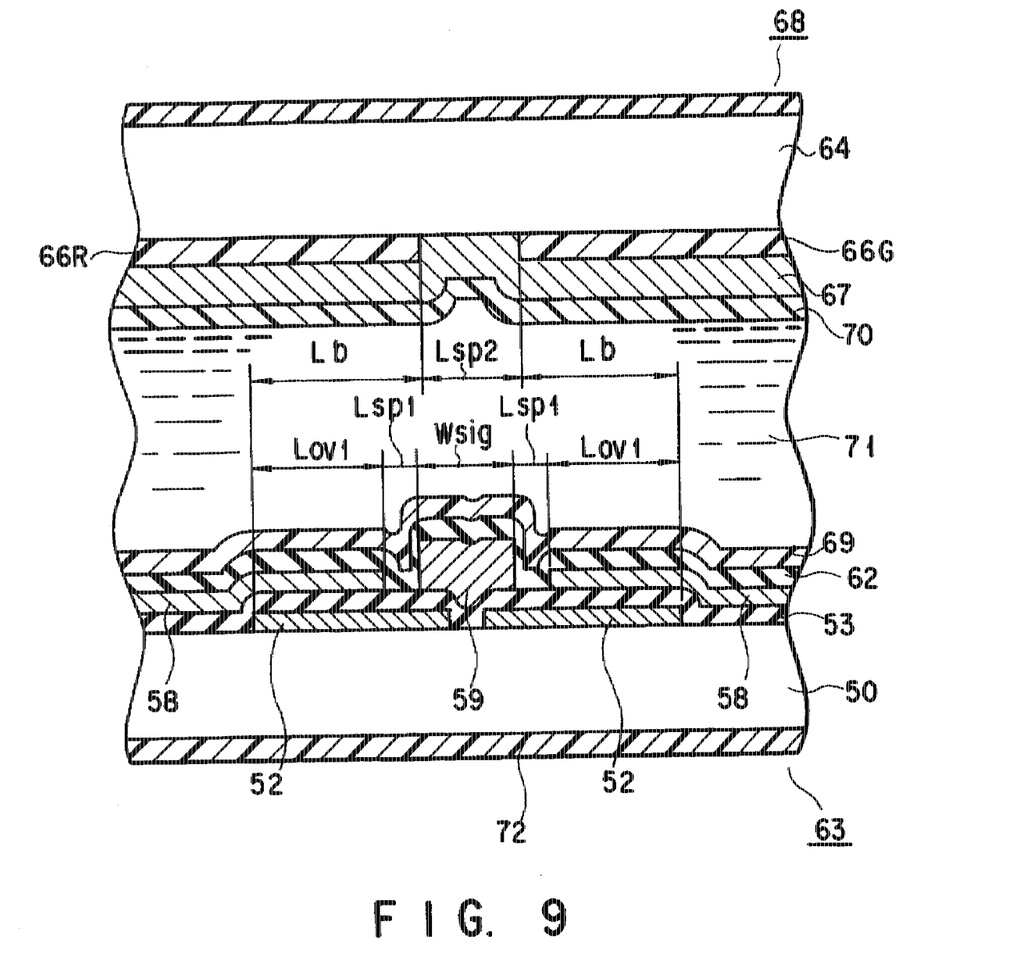
FIG. 9 is a cross-sectional view, taken along line C----C' in FIG. 8, showing the active matrix type liquid crystal display device.

The above-mentioned embodiment can be modified in various ways. As in the first modification shown, for example, in FIGS. 8 and 9, it may be possible to divide the extending electrode 52 beneath a signal line 59 into two parts. By doing so, it is possible to reduce the parasitic capacitance between the signal line 59 and a scanning line 51 and to reduce a load required of the respective electrode drive. In the first modification, consideration was given to the alignment accuracy of the extending electrode 52 relative to the signal line 59 and display pixel electrode 58 and it has been found that the aperture ratio is 65%.

Figure 10:
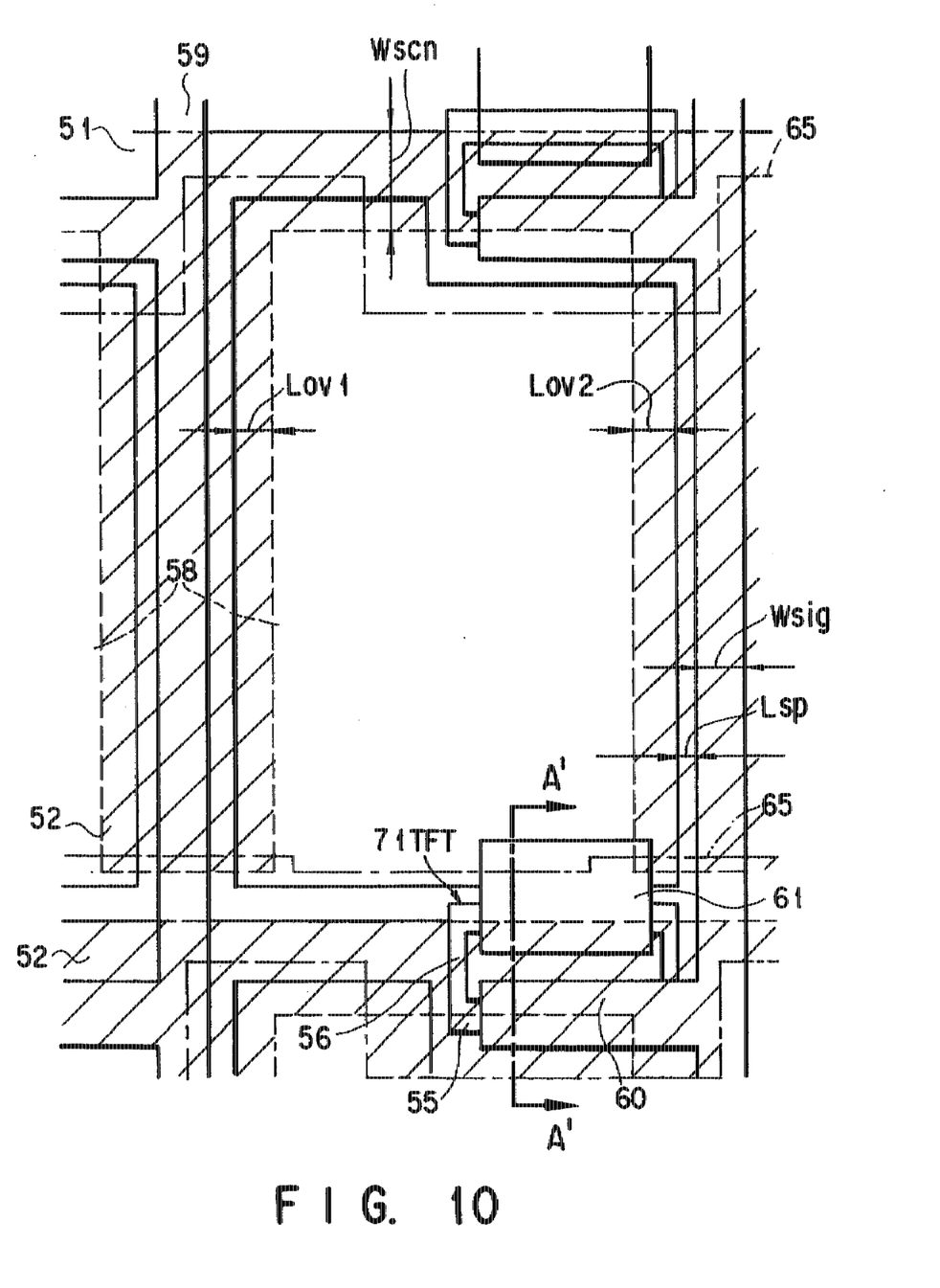
FIG. 10 is a plan view showing one pixel and its peripheral area in a second modification of the active matrix type liquid crystal display device.

Further, it may be possible to vary the shape of a light shielding layer 65 as in a second modification shown in FIG. 10. That is, the extending electrode 52 extends beyond the end of a source electrode into the neighborhood of the scanning line 51 and the light shielding layer 69 is so formed as to cross the extending electrode 52 and source electrode 61. For the arrangement shown it is possible to further improve the aperture ratio by reducing the light shutting area at those parallel areas of the scanning line 51 and display pixel electrode 58 in which case the source electrode 61 is utilized as a light shutting means.

An optically black striped layer may be provided to cover the signal line 59. By doing so, the adjacent pixel is marked off to further improve the contrast. At that time, it is possible to obtain improved contrast, without lowering the aperture ratio at all, by making the width of the striped layer substantially equal to, or smaller than, that of the extending electrode 52.

The optical black striped layer may be provided directly on the signal line 59 or with another layer interposed or on an counter substrate 68 side. In more detail, use is made of a metal material, such as Cr, or a metal oxide. Further, optical black may be obtained by dispersing pigment and metal filler in a resin and a laminated structure may be employed. For the counter substrate 68 an adjacent colored layer 66 may be provided at an area just above the signal line 59 to provide an overlapped area. That is, this is the same as in the above-mentioned embodiment in that the distance of the adjacent colored layer 66 is initially set to Lsp2 to provide a colored layer and that the array substrate 63 and counter substrate 68 are combined to provide a liquid crystal display device. By forming a colored layer 66 in the manufacture of the counter substrate 68 and performing a heating step at a predetermined temperature, an overlapped area may be formed relative to the adjacent colored area 66 at an area just above the signal line 59. Further, if a material of less light reflection is selected from among such optical materials, it is possible to reduce external light reflection and hence to obtain much better display.

If a material of less resistance is selected as the material of the light shielding layer 65 and makes electrical connection with the counter electrode 67, it is possible to lower the resistive value of the counter electrode 67 and reduce the layer thickness of the counter electrode 67 and further improve the light transmittance.

With the above-mentioned embodiment, although the scanning line 51 is made a single Ta layer, use may be made of a low resistance metal material, such as Al or their laminate structure. By doing so, the time constant of the scanning line is lowered and it is possible to lower the loads for driving the scanning line and signal line.

Further, the application of the drive voltage to the scanning line 51 may be effected from the array substrate 63 side or the application terminals to the scanning line 51 are brought out to both the left and right sides of the array substrate 63 whereby a greater electrode pitch can be taken so as to make connection to the drive circuit. The same thing can also be said about effecting the feeding to the signal line 59 side.

Figure 13:
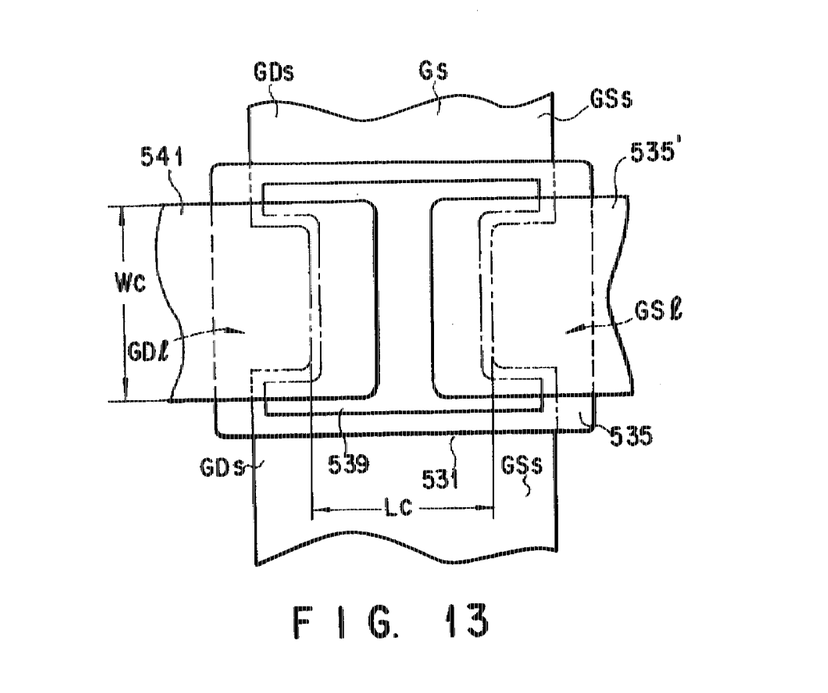
FIG. 13 is an expanded plan view showing a TFT and its peripheral area in a third modification of the active matrix type liquid crystal display device shown in FIG. 1.

The arrangement of the TFT 71 area may be replaced by that of a third modification in which the gate electrode 531, the drain electrode 541, and the source electrode 535 are formed as shown in FIG. 13.

That is, TFT involves more photo leakage along a "side channel" route along a direction of the channel length of the channel region. This is probably due to the fact that, in the middle portion (main channel) of the TFT channel, an area producing less photocarriers is situated at those overlapped portions between the gate electrode and the source and drain electrodes while, on the other hand, no such area is situated at the side channel.

This TFT structure inhibits the generation of photocarriers by making the side channel length (at least one of those shortest distances from the point of intersection between the contour of the gate electrode 531 and that of the drain electrode 541) longer than the main channel length (the shortest distance Lc between the overlapped areas of the contour of the gate electrode 531 relative to the drain electrode 541 and source electrode) to provide those portions where no external light enters the side channel area. By doing so it is possible to lower current leakage during the hold period.

This structure can lower the area of the storage capacitance Cs which would otherwise has been required for holding the display pixel electrode. It is, therefore, possible to eliminate one parameter required at the overlapped area between the extending electrode 52 and the display pixel electrode 58 and hence to further improve the aperture ratio involved.

INDUSTRIAL APPLICABILITY

The present invention remarkably improves the aperture ratio of an active matrix type liquid crystal display device whereby it is possible to enhance the utilization efficiency of light coming from a source and to largely improve a dissipation power.

I claim:

1. An active matrix type display device comprising:

a light-transmitting substrate;

scanning lines formed on the light-transmitting substrate;

signals lines formed to intersect the scanning lines and insulated from the scanning lines;

a matrix array of capacitance drive type pixels formed near intersections of the scanning lines and signal lines, each capacitance drive type pixel having a display pixel electrode and a thin film transistor connected between a corresponding signal line and the display pixel electrode; and extending electrodes that are electrically connected to the scanning lines and extend from the scanning lines along the signal lines, each extending electrode being capacitively coupled to the corresponding signal line and a display pixel electrode that is adjacent to the corresponding signal line by overlapping a portion of the adjacent display pixel electrode and the corresponding signal line.

2. The active matrix type display device according to claim 1, wherein the extending electrode is formed on the light-transmitting substrate and is covered by an insulating film, which insulates the extending electrode from the corresponding signal line and the adjacent display pixel electrode and which serves as a gate insulating film for the thin film transistor.

3. The active matrix type display device according to claim 1, wherein the extending electrode has a width that is greater than a width of the corresponding signal line so as to extend across a gap formed between the corresponding signal line and the adjacent display pixel electrode.

4. The active matrix type display device according to claim 1, wherein the capacitance drive type pixel is a liquid crystal pixel.

5. The active matrix type display device according to claim 1, wherein the extending electrode is made of a light shielding material.

6. The active matrix type display device according to claim 5, wherein the thin film transistor includes:

a gate electrode formed from the corresponding scanning line and covered by a gate insulating film;

a semiconductor layer formed on the gate insulating film;

a source electrode connected to the display pixel electrode, the source electrode having an electrical contact that is formed on the semiconductor layer and overlaps a first side of the gate electrode; and a drain electrode connected to the corresponding signal line, the drain electrode having an electrical contact that is formed on the semiconductor layer and overlaps a second side of the gate electrode;

wherein a channel length of the thin film transistor is defined by a distance between the electrical contacts of the source electrode and the drain electrode.

7. The active matrix type display device according to claim 5, wherein the corresponding signal line is masked by a striped layer that is made of an optically black material and that is not wider than a width of the extending electrode.

8. The active matrix type display device according to claim 5, wherein a gap between two adjacent display pixel electrodes located on two sides of the scanning line that is electrically connected to the extending electrode is masked by a striped layer that is made of a light shielding material that extends along the scanning line.

9. The active matrix type display device according to claim 8, wherein the light-transmitting substrate faces a second light-transmitting substrate and a liquid crystal cell is interposed therebetween, and the striped layer is formed in the second light-transmitting substrate.

10. The active matrix type display device according to claim 8, wherein colored layers are formed at apertures defined by the striped layer.

11. The active matrix type display device according to claim 8, wherein:

the extending electrode extends up to a thin film transistor that selectively turns on and off in accordance with a control of an adjacent scanning line that is disposed next to the scanning line that is electrically connected to the extending electrode;

the thin film transistor has a gate electrode that is formed of the adjacent scanning line, a drain electrode that is connected to the corresponding signal line and is made of a light shielding material, and a source electrode that connected to an adjacent display pixel electrode that is capacitively coupled to the extending electrode and is made of the light shielding material; and the striped layer is arranged to mask an area, including the scanning line, the thin film transistor that turns on and off in accordance with a control of the adjacent scanning line, a portion of the extending electrode that is electrically connected to the scanning line, and a portion of the adjacent display pixel electrode.

12. The active matrix type display device according to claim 1, wherein the adjacent display pixel electrode is connected to a thin film transistor that selectively turns on and off in accordance with a control of a scanning line that is disposed next to the scanning line that is electrically connected to the extending electrode that is capacitively coupled to the adjacent pixel electrode.

13. The active matrix type display device according to claim 1, wherein the thin film transistor has a channel region located within a boundary of the corresponding scanning line.

14. The active matrix type display device according to claim 13, wherein the extending electrode has a width that is greater than a width of a scanning line that is electrically connected thereto.

15. The active matrix type display device according to claim 1, wherein the thin film transistor includes:

a light-shielding gate electrode that is electrically connected to a corresponding one of the scanning lines and is covered by a gate insulating film;

a semiconductor layer formed on the gate insulating film;

a light-shielding source electrode that is connected to the display pixel electrode, has an electrical contact that is formed on the semiconductor layer, and overlaps with a first side of the gate electrode; and a light-shielding drain electrode that is connected to the corresponding signal line, has an electrical contact that is formed on the semiconductor layer, and overlaps with a second side of the gate electrode;

wherein a channel region is defined in the semiconductor layer above the gate electrode between the electrical contacts of the source electrode and the drain electrode to have a length that is less than a width of the gate electrode, and wherein the gate electrode has wider portions at areas corresponding to sides of the channel region so as to reduce light that is applied to the sides of the channel region and that is not being shielded by the source electrode and the drain electrode.

16. The active matrix type display device according to claim 1, wherein the extending electrode has overlapped areas that overlap two adjacent display pixel electrodes that are located on two sides of the corresponding signal line and that have a length substantially equal to lengths of the two display pixel electrodes along the corresponding signal line.

17. The active matrix type display device according to claim 1, wherein:

the extending electrode extends up to a thin film transistor that selectively turns on and off in accordance with a control of an adjacent scanning line that is disposed next to the scanning line that is electrically connected to the extending electrode, and the thin film transistor has a gate electrode that is formed of the adjacent scanning line, a drain electrode that is connected to the corresponding signal line and is made of a light shielding material, and a source electrode that is connected to an adjacent display pixel electrode that is capacitively coupled to the extending electrode and is made of the light shielding material.

* * * * *